United States Patent [19]
Sturhan

[11] 3,806,075
[45] Apr. 23, 1974

[54] ADJUSTABLE SEAT FOR AUTOMOTIVE VEHICLES

[75] Inventor: Klaus Sturhan, Lemgo/Lippe, Germany

[73] Assignee: Gebr. Isringhausen, Lemgo/Lippe, Germany

[22] Filed: Mar. 31, 1972

[21] Appl. No.: 241,095

[30] Foreign Application Priority Data
Apr. 5, 1971 Germany.......................... 7113072

[52] U.S. Cl. .............................................. 248/399
[51] Int. Cl. ................................................ B60m 1/02
[58] Field of Search ............ 248/399, 400, 401, 421

[56] References Cited
UNITED STATES PATENTS

| | | | |
|---|---|---|---|
| 2,531,572 | 11/1950 | Knoedler | 248/400 |
| 2,840,140 | 6/1958 | Harrington | 248/400 |
| 3,194,531 | 7/1965 | Langer | 248/162 |
| 3,268,200 | 8/1966 | Eicher | 248/399 |
| 3,314,672 | 4/1967 | Persson | 248/399 |
| 3,519,240 | 7/1970 | Swenson | 248/399 |
| 3,572,624 | 3/1971 | Holdampf | 248/399 |
| 3,599,232 | 8/1971 | Tabor | 248/399 |
| 3,608,855 | 9/1971 | Osenberg | 248/400 |
| 3,705,745 | 12/1972 | Ambrosius | 248/399 |

FOREIGN PATENTS OR APPLICATIONS

| | | | |
|---|---|---|---|
| 630,471 | 7/1963 | Belgium | 248/421 |
| 674,251 | 6/1952 | Great Britain | 248/399 |
| 873,978 | 8/1961 | Great Britain | 248/399 |
| 1,311,708 | 10/1962 | France | 248/399 |
| 1,530,754 | 6/1969 | Germany | 248/399 |

*Primary Examiner*—Marion Parsons, Jr.
*Attorney, Agent, or Firm*—Michael S. Striker

[57] ABSTRACT

A seat for use in automotive vehicles wherein the body-supporting upper portion is movable toward and away from a base portion in response to changes in the inclination of two pairs of links which are articulately connected with the two seat portions. One or more helical springs are attached to the base portion and to a spindle nut which is movable up and down along a feed screw. The latter is rotatable in arms provided on one pair of links and extending downwardly beyond the fulcrum for the lower ends of such links. The feed screw can be rotated by means of a hand wheel to thereby adjust the bias of the springs. A shock absorber is mounted in the base portion and its upper section is adjustably secured to the one pair of links so that the shock absorber can be adjusted independently of the springs and vice versa.

13 Claims, 1 Drawing Figure

PATENTED APR 23 1974
3,806,075
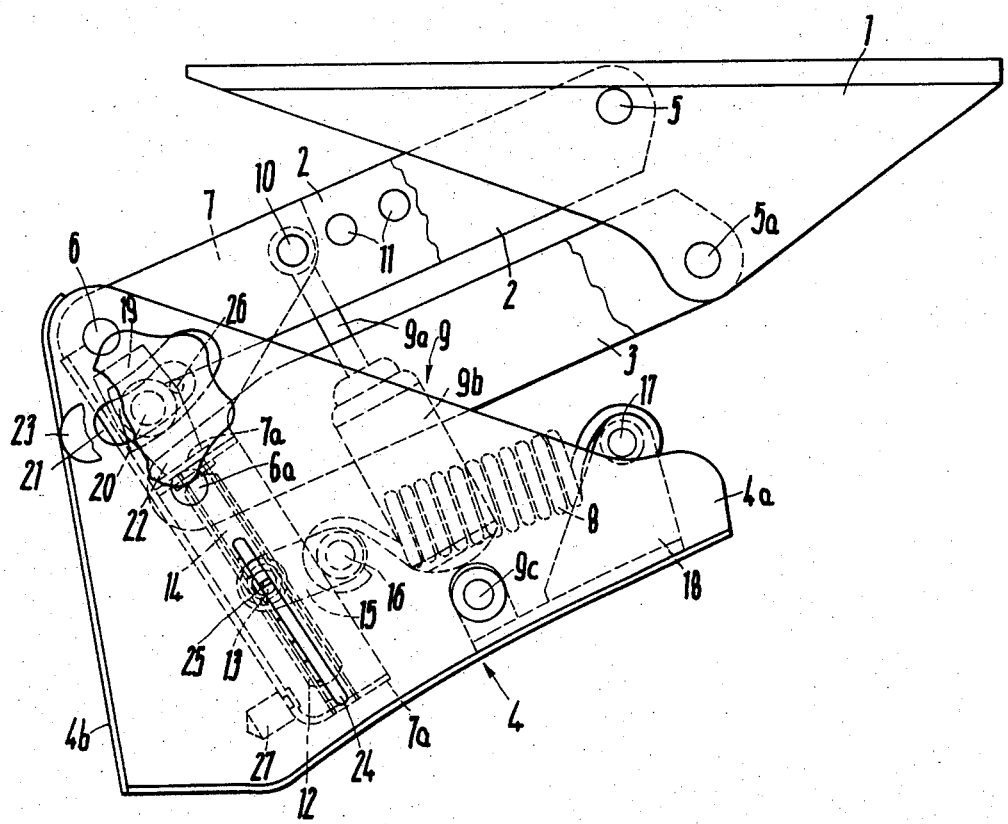

ADJUSTABLE SEAT FOR AUTOMOTIVE VEHICLES

BACKGROUND OF THE INVENTION

The present invention relates to seats in general, and more particularly to improvements in seats which can be used in automotive vehicles. Still more particularly, the invention relates to improvements in seats wherein a body-supporting upper portion is movable relative to a base portion without any or with minimal changes in its inclination.

It is already known to mount the upper portion of a seat for use in automotive vehicles on pairs of parallel links which allow the upper portion to move up and down but hold the upper portion against any appreciable changes in its inclination. The cushioning means normally comprises a spring which tends to move the upper portion to a raised position and a shock absorber which operates between the upper portion and the base portion. As a rule, the spring is a helical spring which surrounds the shock absorber and its upper end portion (together with the upper section of the shock absorber) is attached to the shaft which couples the upper ends of one pair of links with the upper seat portion. The lower end portion of the spring (and the lower section of the shock absorber) is adjustably mounted in the base portion of the seat so that it can be moved to several positions in order to change the initial stressing of the spring. This renders it possible to change the spring bias in dependency on the weight of the occupant whose body rests on the upper seat portion.

A drawback of the just described conventional seats is that any adjustment of the spring bias necessarily entails an adjustment of the shock absorber. This often is undesirable because an optimum adjustment of the shock absorber (for example, to compensate for unevenness of a particular road or terrain) need not necessarily insure an optimum adjustment of the spring, or vice versa. The spring compensates mainly for the weight of the occupant whereas the shock absorber compensates for unevenness of the surface along which the vehicle travels. Thus, an appropriate adjustment of the spring in dependency on the weight of the occupant might result in such adjustment of the shock absorber that the latter is incapable of properly compensating for shocks to which the occupant is subjected when the vehicle is in motion.

SUMMARY OF THE INVENTION

An object of the invention is to provide a novel and improved seat wherein the body-supporting upper portion is movable toward and away from a base portion and wherein the adjustment of resilient means which is provided to compensate for the weight of the occupant need not affect (or need not unduly affect) the setting of one or more shock absorbing devices, or vice versa.

Another object of the invention is to provide the seat with novel and improved mounting for the resilient means and shock absorber means in a seat of the above outlined character.

A further object of the invention is to provide a novel and improved means for indicating to the occupant an optimum adjustment of the resilient means without necessitating any observation of the actual position of such indicating means.

An additional object of the invention is to provide in a seat with an adjustable body-supporting portion novel and improved means for facilitating coarse and precise adjustment of the resilient means which compensate for the weight of the occupant.

The improved seat comprises a base portion which can be mounted on the floor in the compartment or cabin of an automotive vehicle, a body-supporting upper portion which is movable up and down, i.e., away from and toward the base portion, a pair of parallel links (each of which may include a set of links) having first and second end portions which are respectively fulcrumed in the base portion and upper portion so as to insure that the inclination of the upper portion changes negligibly or not at all when the upper portion is caused to move relative to the base portion, an extension provided on or rigid with one of the links and projecting downwardly beyond the fulcrum for the first end portion of the one link, resilient means (e.g., one or more strong helical springs) having a first portion secured to the base portion and a second portion adjustably secured to the extension so as to store energy in response to movement of the upper portion toward the base portion, and shock absorber means having a first section adjustably secured to the one link between the first and second end portions of such one link and a second section which is secured to the base portion. The first section of the shock absorber means is movable relative to the second section in response to movement of the upper seat portion with respect to the base portion.

The novel features which are considered as characteristic of the invention are set forth in particular in the appended claims. The improved seat itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a fragmentary side elevational view (with certain parts broken away) of a set which embodies the invention.

DESCRIPTION OF THE PREFERRED EMBODIMENTS

The drawing illustrates a portion of a seat which can be used with advantage in an automotive vehicle, for example, as a driver's seat in a truck or automobile. The seat comprises an adjustable body-supporting upper portion 1 which has a substantially horizontal upper surface and serves to carry a cushion (not shown) as well as a customary back rest. Furthermore, the seat comprises a base portion or foot 4 which is mounted on the floor in the cabin or compartment of an automotive vehicle and is connected with the upper portion 1 by means of two pairs of parallel links 2 and 3. The parts 1, 2, 3 and 4 together form what can be termed a quadric crank chain whereby the upper portion 1 moves upwardly or downwardly (while the inclination of its upper surface remains substantially unchanged) when the links 2 and 3 are caused to pivot, for example, during travel over rough terrain or on a bumpy road. The upper end portions of the links 2 are fulcrumed in the upper seat portion 1, as at 5, and the lower end portions of these links are fulcrumed in the base portion 4, as at 6. The fulcrum 6 is a transverse horizontal shaft which is rigid with the links 2 so that it turns about its axis in response to movement of the upper seat portion 1 toward and away from the base portion 4. The fulcra for the upper and lower end portions of the links 3 are respectively shown at 5a and 6a.

The shaft 6 is further rigidly connected with two downwardly projecting extensions or arms 7 which are located mainly in the interior of the base portion 4 and can be said to be integral with the links 2 because these links are also fixed to the shaft 6. It will be seen that the composite link including the two links 2 and the two extensions 7 constitutes a bell crank lever having a first arm articulately connected with the upper portion 1 and a second arm confined in the interior of the base portion 1.

The median portions of the links 2 are articulately connected with the upper section 9a of a hydraulic or pneumatic shock absorber 9 which further includes a second or lower section 9b articulately connected with the base portion 4, as at 9c. The sections 9a, 9b are movable relative to each other in response to pivoting of the links 2 and serve to cushion the upper seat portion 1 during travel on uneven terrain. In the illustrated embodiment, the upper section 9a of the shock absorber 9 has a coupling pin 10 which is removably received in one of several pairs of registering holes or openings 11 provided in the links 2 substantially midway between the fulcra 5 and 6. By moving the coupling pin 10 into another pair of openings 11, the user can change the distance between the shaft 6 and the point of connection of the upper section 9a to the links 2 to thereby change the moment or effort arm of the shock absorber 9. If desired, the coupling pin 10 can be moved between an infinite number of positions by means of a suitable adjusting mechanism so that it can be placed at any desired distance from the shaft 6. A suitable adjusting mechanism may include a feed screw which is rotatably mounted between the links 2 so that it extends in the longitudinal direction of these links, and a spindle nut which is provided on the upper end of the section 9a and meshes with the feed screw so that it travels toward or away from the shaft 6 in response to rotation of the feed screws by means of a wheel or the like.

The extensions 7 of the links 2 are provided with elongated guide slots 12 which extend substantially or exactly radially of the shaft 6 and receive two followers in the form of pins or trunnions provided on a spindle nut 13 which is disposed between the extensions 7 and meshes with a rotatable feed screw 14. The spindle nut 13 is provided or connected with a short link 15 which is coupled to one end portion of at least one helical spring 8 by means of a pin 16. The other end portion of the spring 8 is connected with the base portion on 4. As shown, the right-hand end portion of the spring 8 engages a horizontal pin 17 which is mounted in a bracket 18 of the base portion 4. The structure which is shown in the drawing preferably comprises two helical springs 8, one at each side of the feed screw 14. Thus, the pin 15 may extend beyond both sides of the link 15 and the left-hand end portions of the two springs 8 are then connected to such pin at the opposite sides of the link 15. The lower section 9b of the shock absorber 9 is preferably located between the two helical springs.

The feed screw 14 is rotatably mounted in transversely extending bridge members 7a which connect the two extensions 7 to each other. The feed screw 14 is free to rotate but cannot move axially so that the spindle nut 13 is compelled to move lengthwise of the slots 12 when the feed screw 14 is caused to rotate by a mechanism including a set of bevel gears 19 and a shaft 20 which extends outwardly through an arcuate slot 21 provided in a side wall 4a of the base portion 4. The outer end portion of the shaft 20 (which is rotatably journalled in at least one of the extensions 7) is provided with a hand wheel 22 or the like so that it can be readily rotated by one hand of the driver or passenger in order to rotate the feed screw 14 with attendant movement of the spindle nut 13 toward or away from the shaft 6. It will be noted that the gears 19, the shaft 20 and the hand wheel 22 participate in angular movements of the extensions 7 about the axis of the shaft 6.

The outwardly extending portion of the shaft 20 is surrounded by an indicating device or marker 23 which is rotatable relative to the shaft 20 and is secured to one of the extensions 7 by one or more screws or analogous fasteners 26. When properly secured to the extensions 7, the marker 23 enables the occupant of the seat to determine, without looking at the marker, whether or not the upper seat portion 1 is located in a predetermined median or neutral position with respect to the base portion 4. In such neutral position of the upper seat portion 1, the front end of the marker 23 is at least substantially flush with the outer side of the front wall 4b of the base portion 4 so that the occupant of the seat can use a single finger to rapidly determine whether or not the upper seat portion 1 dwells in the neutral position. The marker 23 surrounds the shaft 20 between the hand wheel 22 and the outer side of the wall 4a. When the marker 23 is flush with the exposed surface of the front wall 4b, the shaft 20 is located substantially midway between the ends of the arcuate slot 21 in the side wall 4a. The occupant of the seat then knows that the upper portion 1 is in an optimum position to properly support the body of the occupant during travel of the vehicle on uneven terrain. If the marker 23 is not flush with the front wall 4b when the vehicle is at a standstill, the occupant rotates the hand wheel 22 to change the distance between the left-hand end portions of the springs 8 and the shaft 6 and to thus change the stressing of the springs with attendant change in the inclination of the links 2, 3.

Coarse adjustments of initial stressing of the springs 8 can be effected by observing an auxiliary indicating device or index 25 which is suitably secured to the spindle nut 13 and is guided in an elongated slot 24 of the side wall 4a. The external surface of the side wall 4a may be provided with one or more rows of graduations adjacent to the slot 24 to facilitate a coarse adjustment of the spring bias.

At least one of the extensions 7 is preferably provided with one or more stops 27 which may constitute elastic cushions and abut against the inner side of the front wall 4b when the upper seat portion 1 reaches its lower end position. It is equally possible to mount one or more elastic stops at the inner side of the wall 4b in the path of movement of the extensions 7 in a clockwise direction.

The aforementioned but not illustrated adjusting means for moving the coupling pin 10 of the upper shock absorber section 9a between an infinite number of positions may include a feed screw which is analogous to the feed screw 14 and a spindle nut which carries the coupling pin 10 and is analogous to the spindle nut 13. A hand wheel for rotating the feed screw of the adjusting means for the coupling pin 10 can be located at the exposed surface of the front wall 4b.

In the appended claims, the term "resilient means" is intended to embrace one or more helical or otherwise constructed springs, and the term link is intended to denote one or more links 2 or one or more links 3. Also, the term "extension" is intended to denote one or more arms 7.

An important advantage of the improved seat is that the bias of the spring or springs 8 can be adjusted independently of the shock absorber 9. Thus, the occupant of the vehicle can rotate the hand wheel 22 until the front end of the marker 23 is flush with the exposed surface of the wall 4b while the position of the coupling pin 10 with respect to the links 2 remains unchanged. Inversely, the pin 10 can be inserted into another pair of registering openings 11 or otherwise adjusted while the position of the spindle nut 13 with reference to the feed screw 14 remains unchanged.

Another important advantage of the improved seat is that a single type of shock absorbers can be used in different types of seats, i.e., in seats which require a more or less pronounced cushioning or shock absorbing action. Thus, if the seat requires a very pronounced cushioning action the coupling pin 10 of the shock absorber 9 will be inserted into a first set of openings 11, whereas the same shock absorber which is used in another seat requiring a less pronounced cushioning action will have its coupling pin 10 inserted into a different set of openings 11.

The mounting of the entire adjusting means for the bias of the springs 8 on the extensions 7 of the links 2 is of advantage because such adjusting means can be fully assembled before the links 2 are attached to the base portion 1. Since the marker 23 can be detected by hand (i.e., it need not be observed during adjustment of the spring bias), an optimum position of the spindle nut 13 with reference to the feed screw 14 can be selected while the seat is occupied. This is of advantage because the adjustment can be carried out much more effectively and conveniently while the occupant's weight rests on the upper seat portion 1. The hand wheel 22 is also within reach of the occupant's hand so that it can be manipulated by the same hand which scans the position of the marker 23 with respect to the exposed surface of the wall 4b. It is evident, however, that the side wall 4a can be provided with a suitable projection or the like which is aligned with a selected portion of the marker 23 or an analogous indicating device in neutral position of the upper seat portion 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a seat, particularly for use in an automotive vehicle, a combination comprising a base portion; a body supporting upper portion; a pair of parallel links having first and second end portions respectively fulcrumed in said base and upper portions, one of said links having an extension projecting downwardly beyond the fulcrum for its first end portion; resilient means having a first portion secured to said base portion and a second portion secured to said extension and arranged to store energy in response to movement of said upper portion toward said base portion; shock absorber means having a first section secured to said one link and a second section secured to said base portion, said first and second sections being movable relative to each other in response to movement of said upper portion toward or away from said base portion; and adjusting means operatively connected with said resilient means for varying the bias of the same independently of and without effect on said shock absorber means.

2. A combination as defined in claim 1, wherein said one link is a bell crank.

3. A combination as defined in claim 1, said adjusting means comprising adjusting elements actuatable to move said first portion of said resilient means relative to said extension and substantially radially of the fulcrum for the first end portion of said one link.

4. A combination as defined in claim 3, wherein said adjusting elements comprise a feed screw rotatably mounted in said one link on a spindle nut meshing with said feed screw and secured to said first portion of said resilient means.

5. A combination as defined in claim 4, wherein said extension has at least one elongated guide slot and said spindle nut comprises follower means extending into and movable lengthwise of said slot in response to rotation of said feed screw.

6. A combination as defined in claim 1, wherein said adjusting means is mounted in said extension of said one link.

7. A combination as defined in claim 1, wherein said adjusting means comprises a feed screw rotatably mounted in said extension, a spindle nut meshing with said feed screw and connected with the first portion of said resilient means, and means including a rotary shaft for rotating said feed screw, said base portion having a first wall provided with a slot and a second wall, said shaft extending outwardly through said slot and being provided with indicating means which is at least substantially flush with said second wall in a predetermined position of said upper portion relative to said base portion.

8. A combination as defined in claim 7, wherein said indicating means is rotatable on said shaft and further comprising fastener means securing said indicating means to said one link.

9. A combination as defined in claim 1, wherein said base portion has a front wall and said extension is provided with stop means abutting against said front wall in a predetermined lower end position of said upper portion relative to said base portion.

10. A combination as defined in claim 9, wherein said stop means includes at least one elastic cushion.

11. A combination as defined in claim 1, wherein said first section of said shock absorber means is adjustable with respect to said one link.

12. A combination as defined in claim 11, further comprising additional adjusting means for moving said one section between an infinite number of positions relative to said one link.

13. A combination as defined in claim 11, wherein said one link is provided with a plurality of openings intermediate said first and second end portions thereof, said first section including a male coupling element which is removably received in a selected opening of said one link.

* * * * *